(12) United States Patent
Mitchell

(10) Patent No.: US 6,216,267 B1
(45) Date of Patent: Apr. 10, 2001

(54) MEDIA CAPTURE AND COMPRESSION COMMUNICATION SYSTEM USING HOLOGRAPHIC OPTICAL CLASSIFICATION, VOICE RECOGNITION AND NEURAL NETWORK DECISION PROCESSING

(75) Inventor: James P. Mitchell, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 09/360,512

(22) Filed: Jul. 26, 1999

(51) Int. Cl.[7] .............................. H04N 7/10; G06K 9/74; G06K 9/76; G06K 9/46
(52) U.S. Cl. ........................ 725/93; 725/116; 725/146; 382/210; 382/212; 382/232
(58) Field of Search ................... 348/6; 382/199, 382/210–212, 216, 232; 380/54; 704/275

(56) References Cited

U.S. PATENT DOCUMENTS

| | | | |
|---|---|---|---|
| 4,156,914 | * 5/1979 | Westell | 382/199 |
| 5,253,530 | * 10/1993 | Letcher, III | 73/602 |
| 5,659,665 | * 8/1997 | Whelpley, Jr. | 395/2.84 |
| 5,793,871 | * 8/1998 | Jackson | 380/54 |
| 5,953,452 | * 9/1999 | Boone et al. | 382/199 |

OTHER PUBLICATIONS

Two–dimensional all–optical parallel–to series TDM and demultiplexing by spectral–holographic methods. Peter H. Handel, Physics Dept. Univ. of Missouri, St. Louis, Mo 63121.*

An Optical Fourier/Electronic Neurocomputer Automated Inspection system. David E. Glover. Global Holonetics Corporation, Fairfield, IA 52556.*

Optical Hartley Transforms. John D. Villasensor, member IEEE. Proceedings of IEEE, vol. 82, No. 3, Mar. 1994.*

Method and apparatus for machine processing using wavelet/wavelet–packet bases. Coifman Ronald et al. WO 91/18362. Nov. 28, 1991.*

Digital Video Compression—An overview. Joseph B. Waltrich, Member, IEEE. Journal of Lightwave technology, vol. 11, No. 1, Jan. 1993.*

Optical Computing Techniques for Image/Video compression. Akitoshi Yoshida and John H. Reif, Fellow, IEEE. Proceeding of the IEEE, vol. 82, No. 6, Jun. 1994.*

* cited by examiner

Primary Examiner—Andrew Faile
Assistant Examiner—Hai V. Tran
(74) Attorney, Agent, or Firm—Nathan O. Jensen; Kyle Eppele; James P. O'Shaughnessy

(57) ABSTRACT

A system and method for capturing and processing audio and video images for optimized transmission over a lower bandwidth communications channel are disclosed. A digital processing system receives video and audio signals from a media source such that the video and audio signals are representative of captured images and sounds as a multimedia signal. An optical processing system is coupled to the digital processing system and performs signal processing algorithms on the multimedia signal. A transceiver transmits the multimedia signal over a lower bandwidth communications channel wherein the multimedia signal is optimized for transmission over the lower bandwidth communications channel by the signal processing algorithms performed by the optical processing system.

20 Claims, 3 Drawing Sheets

MEDIA CAPTURE AND COMPRESSION COMMUNICATION SYSTEM USING HOLOGRAPHIC OPTICAL CLASSIFICATION, VOICE RECOGNITION AND NEURAL NETWORK DECISION PROCESSING

FIELD OF THE INVENTION

The present invention generally relates to the field of media communications systems, and particularly to an audio/video system utilizing optical processing.

BACKGROUND OF THE INVENTION

Traditional semiconductor based digital electronic processors are typically serial devices processing data in a serial manner, i.e. a first operation is performed on a first set of data before a second set of data is fetched and operated upon. Although advents in semiconductor based vocoders and processor architectures, such as predictive branching and higher microprocessor speed, have provided systems capable of performing increasingly faster operations, the fundamental serial structure of semiconductor processing systems inherent in the device technology (e.g., von Neumann architecture) have limited the speed at which complex processing algorithms such as video signal processing and compression may be performed with a general purpose semiconductor based processor. Further, although specialized semiconductor processors have been developed having architectures optimized for signal processing algorithms (e.g., digital signal processors, Harvard architecture), semiconductor devices still exhibit a signal processing limit. These problems become apparent when it is desired to transmit video or audio over a limited bandwidth channel. Since video and audio signals many times have a greater bandwidth than the channel over which it is desired to transmit, compression algorithms are utilized to reduce the bandwidth such that transmission over the lower bandwidth channel may be achieved. However, video and some audio compression algorithms require large amounts of processing power. Using traditional semiconductor processors to perform the compression algorithms in real-time or near real-time many times requires too much processing time to accomplish high quality image or audio compression. Therefore, at best, semiconductor processors only provide lossy video compression (where some information quality and content is sacrificed) as real time compression is approached.

However, optical processors using holographic image processing/classification techniques are capable of processing information in parallel such that much more complex image processing algorithms such as compression, correlations, and transform decompositions may be processed in much shorter amount of time than with traditional semiconductor processors. Such optically implemented image classification and processing algorithms may provide optimized transmission of video, image and graphics file signals over lower bandwidth channels. Furthermore, by combining an optical processor with a media communication system, voice command recognition, control and neural network signal processing may be implemented with the system by taking advantage of the parallel processing and data classification provided by an optical processing system. Thus, there lies a need for a media processing and transmission system that utilizes optical processing to provide faster and more optimized transmission of video and audio signals over lower bandwidth communications channels and that further utilizes optical processing to implement voice command recognition and neural network decision processing.

SUMMARY OF THE INVENTION

The present invention is directed to a system for capturing and processing video and audio for optimized transmission over a lower bandwidth communication channel. In one embodiment, the system includes a digital processing system for receiving a video and an audio signal from a media source or sensor wherein the video and audio signals are representative of the media delivered or captured by the media source or sensor, at least one or more optical processing systems coupled to the digital processing system for performing signal classification and processing algorithms on the video and audio signals, and a transceiver for transmitting the combined signals over a lower bandwidth communications channel wherein the signal processing algorithms and classification performed by the optical processing system optimizes the video and audio signals for transmission over the lower bandwidth communications channel. In a further embodiment, the system provides optical processing for voice recognition and neural network processing.

The present system level invention is further directed to a method for transmitting audio and video signals over a lower bandwidth communications channel. In one embodiment, the method includes steps for capturing audio and images and providing the information as a multimedia signal, optimizing the signal for transmission over the lower bandwidth communications channel by performing separate compression algorithms on the video and audio signals with an optical processing system, and transmitting the optimized multimedia signal over the lower bandwidth communications channel.

It is to be understood that both the foregoing general description and the following detailed description are exemplary and explanatory only and are not restrictive of the invention as claimed.

The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiment of the invention, an example of which is illustrated in the accompanying drawings.

Figure 1:
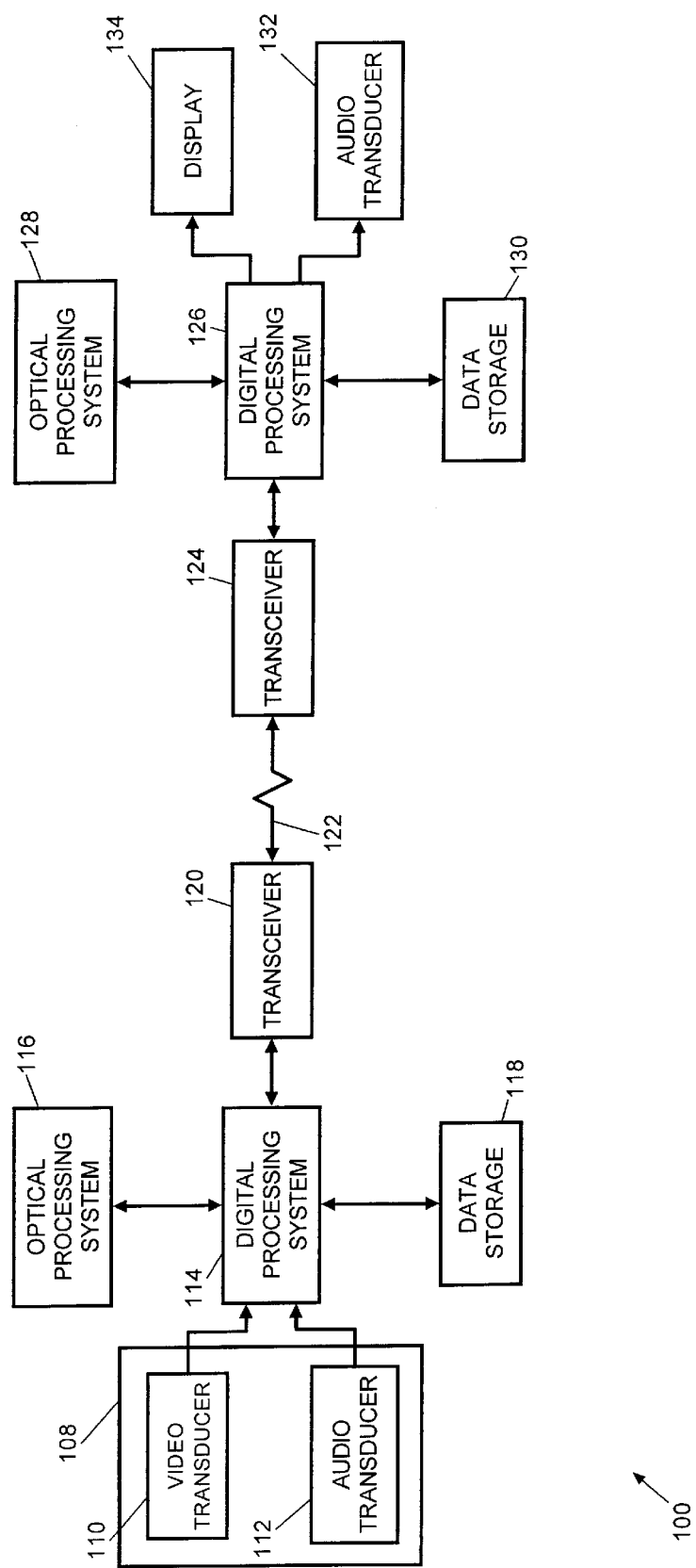
FIG. 1 is a block diagram of a video and audio multimedia system capable of optically processing a video signal and an audio signal in accordance with the present invention.

Referring now to FIG. 1, a block diagram of a video and audio multimedia system capable of optically processing a video source and an audio source will be discussed. The multimedia system 100 receives video images or files captured with a video transducer 110 of a media source 108 and captures audio signals with an audio transducer 112. Video transducer 110 may include, for example, a charge coupled device (CCD) array and related hardware for capturing and buffering frames of video. Audio transducer may comprise, for example, a microphone and preamplifier for capturing and amplifying sounds and providing the sound as a signal representative of the sound at a predetermined signal level. The images and sounds captured by video transducer 110 and audio transducer 112 of media source 108 are provided to a digital processing system 114 that may be, for example, an electronic computer system (such as shown and described with respect to FIG. 2). An optical processing system 116 couples to digital processing system 116 for performing signal processing algorithms utilizing an optical signal processing apparatus.

In operation, multimedia system 100 receives a video signal and an audio signal from media source 110 that are provided to digital processing system 114 as a multimedia signal intended to be transmitted to a remote device or location with a transceiver 120 coupled to digital processing system 114. Typically, the bandwidth of the channel 122 over which the image is to be transmitted is too narrow for real-time transmission of a complete, full bandwidth video and audio multimedia signal. The video and audio signals are processed by an optical processing system 116 coupled to digital processing system 114 prior to transmission such that the video and audio signals are optimized for transmission over the limited bandwidth channel 122. Optical processing system 116 implements a library of definable and programmable signal transforms and holographic image correlators for implementing a wide range of signal decomposition functions including Fourier transforms, Hartley transforms, discrete valued transforms (e.g., z-transforms), transform inversions, signal compression, filtering, etc. A data storage device 118 may be coupled to digital processing system 114 for storing video and audio signal data during processing as required, or for longer term storage of the video and audio signals.

After optical system 116 performs the desired signal processing, the video and audio signals may be transmitted as a processed multimedia signal via channel 122 to be received by a second transceiver 124 disposed at a remote location. The received multimedia signal is processed by a second digital processing system 126 coupled to transceiver 124 for reconstructing the video and audio signals from the received multimedia signal. A second optical processing system 128 coupled to digital processing system 126 implements algorithms for reconstructing the video and audio signals (e.g., inverse transforms) from the received multimedia signal. Upon reconstruction of the video and audio signals, the video signal may then be displayed on display 134, and the audio signal may be reproduced with an audio transducer 132 (e.g., an amplifier and speaker). A data storage device 130 coupled to digital processing system 126 may be used for storing the video and audio signals during processing as required, or for longer term storage of the video and audio signals. As required by the particular application in which multimedia system 100 is utilized, the definable and programmable transforms or correlations performed by optical processing systems 116 and 128 may be optimally selected for the particular utilization of media source 108. For example, a first optical processing algorithm and system may be selected for processing of landscapes, a second algorithm or system may be selected for processing buildings, a third algorithm or system may be selected for processing vehicles, a fourth algorithm or system may be selected for processing images of human beings, a fifth algorithm may be selected for processing conversations, and so on. In one particular embodiment, either of optical processing system 116 or optical processing system 128, alone or in combination, is configured to perform a compression algorithm on the video or audio signals as received and delivered through a Transmission Control Protocol/Internet Protocol (TCP/IP) packet communications network. For example, media source 108 may receive video or audio signals, images, graphics files or multimedia files from a TCP/IP packet communications network (e.g., the Internet).

Figure 2:
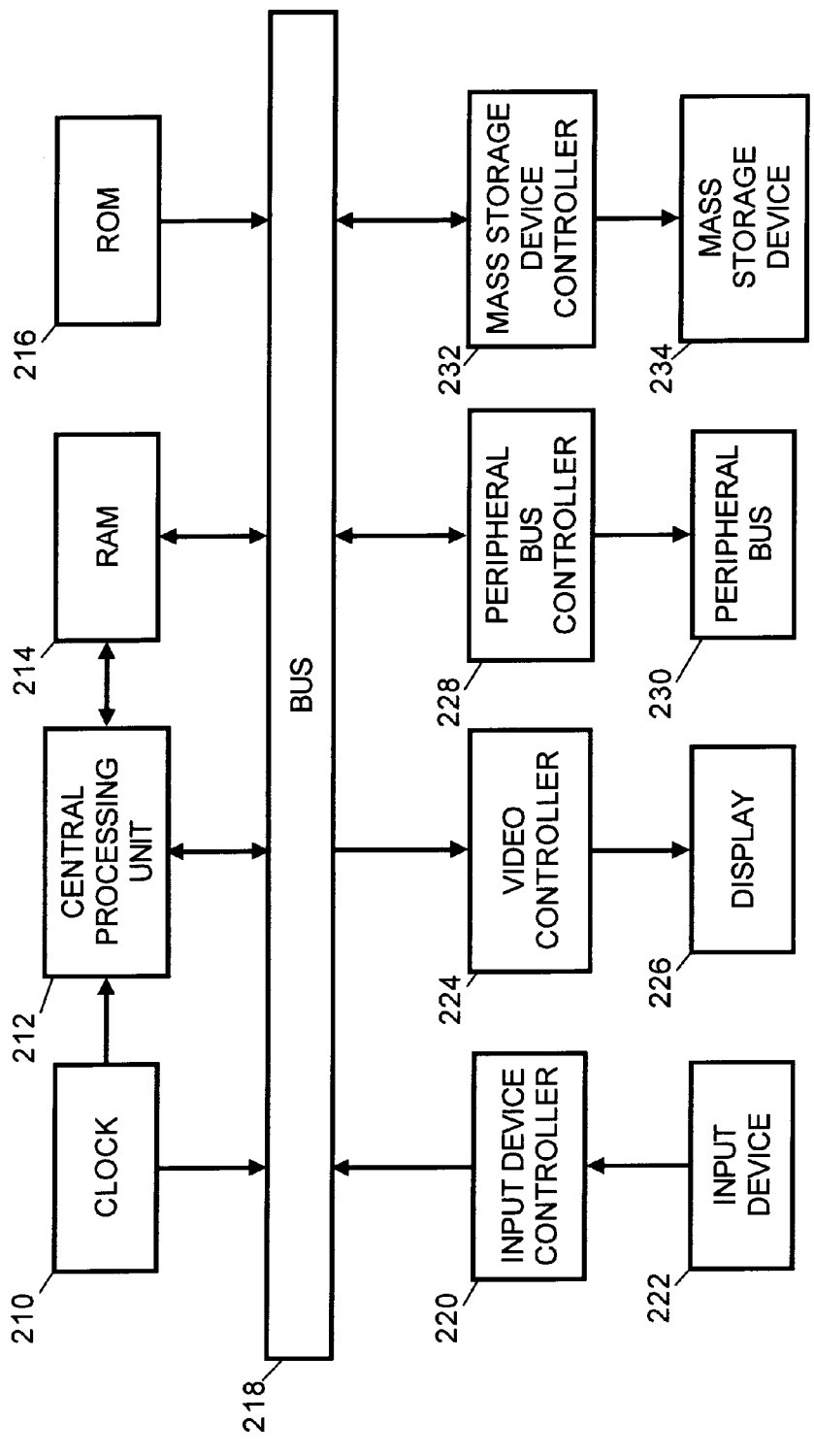
FIG. 2 is a block diagram of the hardware of a computer processing system operable to tangibly embody a digital processing system of the video and audio multimedia system of the present invention.

Referring now to FIG. 2, a computer hardware system operable to tangibly embody a digital processing system of a multimedia system of the present invention will be discussed. The computer system 200 may be utilized for either digital processing system 114 or digital processing system 126 and generally includes a central bus 218 for transferring data among the components of computer system 200. A clock 210 provides a timing reference signal to the components of computer system 200 via bus 218 and to a central processing unit 212. Central processing unit 212 is utilized for interpreting and executing instructions and for performing calculations for computer system 200. Central processing unit 212 may be a special purpose processor such as a digital signal processor. A random access memory (RAM) device 214 couples to bus 218 and to central processing unit 212 for operating as memory for central processing unit 212 and for other devices coupled to bus 218. A read-only memory device (ROM) 216 is coupled to the components of computer system 200 via bus 218 for operating as memory for storing instructions or data that are normally intended to be read but not to be altered except under specific circumstances (e.g., when the instructions or data are desired to be updated). ROM device 216 typically stores instructions for performing basic input and output functions for computer system 200 and for loading an operating system into RAM device 214.

An input device controller 220 is coupled to bus 218 for allowing an input device 222 to provide input signals into computer system 200. Input device 222 may be a keyboard, mouse, joystick, trackpad or trackball, microphone, modem, or a similar input device. Further, input device 222 may be a graphical or tactile input device such as a touch pad for inputting data with a finger or a stylus such. Such a graphical or tactile input device 222 may be overlaid upon a screen of a display device 226 for correlating the coordinates of a tactile input with information displayed on display 226. Display 226 is controlled by a video controller 224 that provides a video signal received via bus 218 to display 226. Display 226 may be any type of display or monitor suitable for displaying information generated by computer system 200 such as cathode ray tube (CRT), a liquid crystal display (LCD), gas or plasma display, or a field emission display panel. Preferably, display 226 is a flat-panel display having a depth being shallower than its width. A peripheral bus controller 228 couples peripheral devices to central bus 218 of computer system 200 via a peripheral bus 228. Peripheral bus 230 is preferably in compliance with a standard bus architecture such as an Electrical Industries Association Recommended Standard 232 (RS-232) standard, an Institute of Electrical and Electronics Engineers (IEEE) 1394 serial bus standard, a Peripheral Component Interconnect (PCI) standard, or a Universal Serial Bus (USB) standard, etc. A mass storage device controller 232 controls a mass storage device 234 for storing large quantities of data or information, such as a quantity of information larger than the capacity of RAM device 214. Mass storage device 232 is typically non-volatile memory and may be a disk drive such as a hard disk drive, floppy disk drive, optical disk drive, floptical disk drive, etc.

Figure 3:
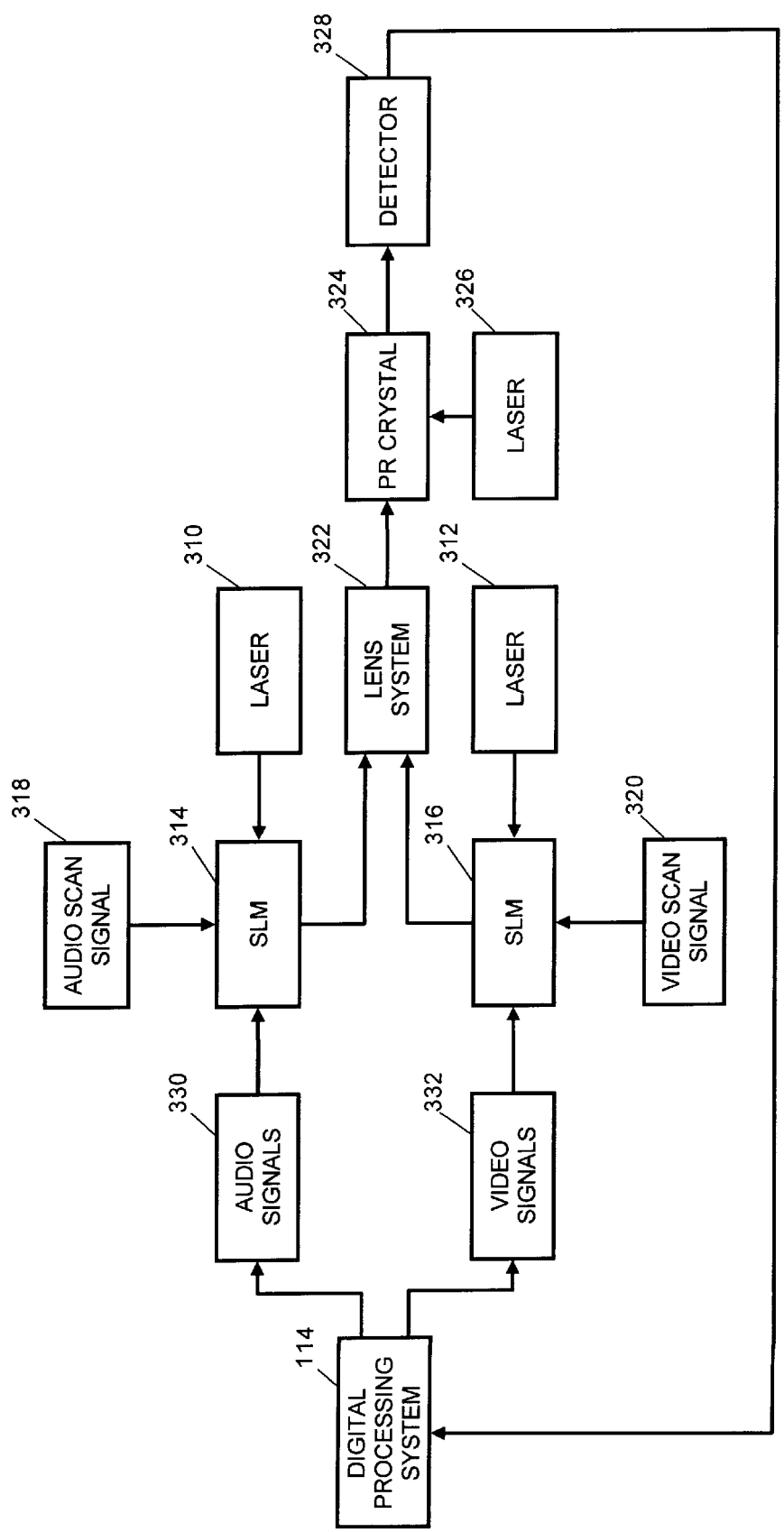
FIG. 3 is a block diagram of a holographic optical processing system for optically processing a video signal and an audio signal in accordance with the present invention.

Referring now to FIG. 3, an optical processing system for optically processing video and audio signals in accordance with the present invention will be discussed. The optical processing system of FIG. 3 may be utilized as one or both of optical processing systems 116 and 128 discussed with respect to FIG. 2. Optical processing system 300 may be utilized to perform a correlation algorithm or the like type of algorithm (e.g., convolution, cross-correlation, etc.). Digital processing system 114 provides the audio signals 330 and the video signals 332 to be processed by optical processing system 300. An audio scan signal 318 to be processed in conjunction with audio signals 330 is coupled to a spatial light modulator (SLM) 314 for modulating the light beam output of a laser 310 impinging upon SLM 314. Audio scan signal 318 may be, for example, a codebook of voice phonemes for decoding phonemes in audio signal 330. Likewise, digital processing system 114 provides video signals 332 to a second SLM 316 for modulating the light beam output of a second laser 312. A video scan signal 320 is provided to SLM 316 such for processing in conjunction with video signals 332. For example, video scan signal may be a codebook of images to be correlated with images present in video signals 332. Optical processing system 300 may be thereby utilized to perform correlation processes between audio signals 330 and audio scan signal 318, and between video signals 332 and video scan signal 320. Other types of optical processing algorithms may also be implemented by optical processing system 300. Optical processing system 300 may be utilized to perform an autocorrelation, for example, to remove undesirable noise from audio signal 330 or video signals 332. Further, optical processing system 300 may be utilized to perform a convolution algorithm, for example, in order to perform digital filtering on audio signals 330 or video signals 332. Additional signal processing techniques (e.g., compression, signal transforms, etc.) may also be implemented by optical processing system 300.

The modulated laser beams are applied to a lens system 322 for directing and focusing the laser beams through a photorefractive (PR) crystal 324 and thereby impinge upon a detector 328. The modulated light beams from lasers 310 and 312 impinge upon photorefractive crystal 324 at different angles of incidence, thereby forming a holographic grating within the crystal. Further, PR crystal 324 may contain data stored holographically that may be further utilized in a signal processing algorithm. For example, a correlation may be performed on audio signals 330 or video signals 332 and the data stored in PR crystal 324. A third light beam from a third laser 326 is applied to PR crystal 324 for reading out the holographic output onto detector 328 as an output signal such that an appropriate signal processing algorithm on audio signals 330 or video signals 332 318 is obtained. Detector 328 may be a charge-coupled device (CCD) for converting optical signals processed by optical processing system into a digital signal readable by digital processing systems 114 or 126 for further signal processing in a discrete-time domain, discrete-amplitude range.

It will be seen that multimedia processing system 100 may be utilized to process audio signals and video signals received by media source 108. Audio transducer 112 may include a microphone and preamplifier for capturing an audio signal. The audio signal may be incorporated as part of the video signal captured by video transducer 110, for example when capturing the image of a person speaking such that the contents of the speech is captured and processed, and the audio and video signals are combined into a multimedia signal (data signal). Additionally, audio transducer 112 may capture voice commands from a user of multimedia system 100 such that the user may operate and control multimedia system 100 through spoken commands and utterances with voice recognition algorithms. Thus, optical processing system 116 may be utilized to process voice commands (i.e. audio instructions) received via audio transducer 112. Optical processing system 116 is capable of processing audio command signal faster than a semiconductor based processor since optical processing may be performed in parallel rather than serially as with semiconductor processors. For example, a book of commands may be stored in PR crystal 324, and a correlation preformed on audio signals 330 to determine which of the commands holographically stored in PR crystal 324 corresponds to the spoken command represented by audio signals 330. Furthermore, optical processing system 116 may be utilized to implement neural network decision processing algorithms for controlling the operation of multimedia system 100, for pattern recognition and image and speech analysis. Since multiple data sets may be stored in PR crystal 324 as holographic images, signal processing on all of the data set images stored in PR crystal may be performed simultaneously such that a neural network computing system may be implemented.

It is believed that the video capture and compression system using holographic optical correlation, signal transform decomposition, voice recognition and neural network decision processing of the present invention and many of its attendant advantages will be understood by the foregoing description, and it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A system for capturing and processing video and audio for optimized transmission over a lower bandwidth communications channel, comprising: a digital processing system for receiving a video signal and an audio signal from a media source, the video signal being representative of an image captured by the media source and the audio signal being representative of sounds captured by the media source;

an optical processing system, coupled to said digital processing system, for performing a signal processing algorithm on the video signal and a for performing a signal processing algorithm on the audio signal; and a transceiver for transmitting the video and audio signals over a lower bandwidth communications channel as a multimedia signal, wherein the signal processing algorithms performed by said optical processing system optimize the video and audio signals for transmission over the lower bandwidth communications channel;

said optical processing system comprising first and second spatial light modulators, said first spatial light modulator encoding audio signals onto a first light beam and said second spatial light modulator encoding video signals onto a second light beam, a lens system for focusing the first and second light beams through a photorefractive crystal, said photorefractive crystal being actuated with a control light beam such that a holographic output is provide by said photorefractive crystal, and a detector for detecting the holographic output of said photorefractive crystal and providing an output in response thereto, the output of said detector being representative of a signal processing routine performed on the video or audio signals by said optical processing system.

2. A system as claimed in claim 1, said digital processing system comprising a semiconductor processor and a memory coupled to said semiconductor processor, said semiconductor processor for executing a program of instructions stored in said memory.

3. A system as claimed in claim 1, said optical processing system being configured to perform a compression algorithm on the video or audio signal.

4. A system as claimed in claim 1, said optical processing system being configured to perform a correlation algorithm on the video signal or the audio signal, respectively, and a reference signal.

5. A system as claimed in claim 1, said optical processing system being configured to perform a transform algorithm on the video signal or the audio signal.

6. A system as claimed in claim 1, said optical processing system being configured to perform an inverse transform on the video signal or the audio signal.

7. A system as claimed in claim 1, the audio signal being captured with an audio transducer, said optical processing system being configured to perform voice command recognition of the audio signal for controlling the system.

8. A system as claimed in claim 1, said optical processing system being configured to perform a neural network algorithm.

9. A system as claimed in claims 1, said optical processing system being configured to perform a compression algorithm on the video or audio signals as received and delivered through a TCP/IP packet communications network.

10. A system for capturing and processing video and audio signals for optimized transmission over a lower bandwidth communications channel, comprising:
   means for receiving a video signal and an audio signal, the video signal being representative of captured images, and the audio signal being representative of captured sounds;
   processing means, coupled to said signal receiving means, for performing an optical signal processing algorithm on the video signal and the audio signal; and
   means for transmitting the video signal and the audio signal over a lower bandwidth communications channel as a multimedia signal, wherein the optical signal processing algorithm performed by said processing means optimizes the video and audio signals for transmission over the lower bandwidth communications channel;
   said processing system comprising first and second means for encoding a signal onto a beam of light, said first encoding means encoding the video signal onto a first light beam and said encoding means encoding the audio signal onto a second light beam, means for focusing the first and second light beams through means for storing data holographically, said holographic data storage means being actuated with a control light beam such that a holographic output is provide by said holographic data storage means, and means for detecting the holographic output of said holographic data storage means and providing an output in response thereto, the output of said detecting means being representative of a signal processing routine performed on the video or audio signals by said processing means.

11. A system as claimed in claim 10, said signal receiving means comprising electronic processing means and means, coupled to said electronic processing means, for storing a program of instructions, said electronic processing means executing a program of instructions stored in said storing means.

12. A system as claimed in claim 10, said processing means being configured to perform a compression algorithm on the video or audio signals.

13. A system as claimed in claim 10, said processing means being configured to perform a correlation algorithm on the video or audio signals, respectively, and a reference signal.

14. A system as claimed in claim 10, said processing means being configured to perform a transform algorithm on the video or audio signals.

15. A system as claimed in claim 10, said processing means being configured to perform an inverse transform on the video or audio signals.

16. A system as claimed in claim 10, the audio signal being captured with means for transducing an audio signal, said processing means being configured to perform voice command recognition of the audio signal for controlling the system.

17. A system as claimed in claim 10, said processing means being configured to perform a neural network algorithm.

18. A system as claimed in claim 10, said processing means being configured to perform a compression algorithm on the video or audio signals as received and delivered through a TCP/IP packet communications network.

19. A method for transmitting a video signal and an audio signal over a lower bandwidth communications channel, comprising:
   capturing images and sounds and providing the images and sounds as a multimedia signal;
   optimizing the multimedia signal for transmission over a lower bandwidth communications channel by performing signal processing algorithms on the multimedia signal with an optical processing system; and
   transmitting the optimized multimedia signal over the lower bandwidth communications channel;
   the optical processing system comprising first and second spatial light modulators, said first spatial light modulator encoding audio signals onto a first light beam and said second spatial light modulator encoding video signals onto a second light beam, a lens system for focusing the first and second light beams through a photorefractive crystal, said photorefractive crystal being actuated with a control light beam such that a holographic output is provide by said photorefractive crystal, and a detector for detecting the holographic output of said photorefractive crystal and providing an output in response thereto, the output of said detector being representative of a signal processing routine performed on the video or audio signals by said optical processing system.

20. A method as claimed in claim 19, further comprising the steps of receiving the optimized multimedia signal and decoding the optimized multimedia signal with an optical processing system whereby the images may be displayed on a display and the sounds may be reproduced.

\* \* \* \* \*